United States Patent

[11] 3,588,193

| [72] | Inventor | Gilbert H. Drutchas<br>Birmingham, Mich. |
|---|---|---|
| [21] | Appl. No. | 829,551 |
| [22] | Filed | June 2, 1969 |
| [45] | Patented | June 28, 1971 |
| [73] | Assignee | TRW Inc.<br>Cleveland, Ohio |

[54] HYDRAULIC ANTISKID SYSTEM
10 Claims, 11 Drawing Figs.

[52] U.S. Cl. .................................................. 303/21F,
188/181R, 303/6R, 303/10, 303/61
[51] Int. Cl. ..................................................... B60t 8/06,
B60t 11/12
[50] Field of Search............................................ 303/6, 10,
21, 24, 68—69, 61 — 63; 188/181

[56] References Cited
UNITED STATES PATENTS

| 2,869,687 | 1/1959 | Keim et al..................... | 303/21UX |
| 3,004,801 | 10/1961 | Wrigley..................... | 303/21UX |
| 3,032,995 | 5/1962 | Knowles..................... | 303/21UX |
| 3,124,220 | 3/1964 | Kell......................... | 303/21X |
| 3,276,822 | 10/1966 | Lister et al................ | 303/21X |
| 3,463,555 | 8/1969 | Ryskamp..................... | 303/21 |

Primary Examiner—Trygve M. Blix
Assistant Examiner—John J. McLaughlin
Attorney—Hill, Sherman, Meroni, Gross & Simpson

ABSTRACT: An hydraulic skid control wherein hydraulic braking means apply a decel bias to the wheels of a vehicle and a wheel-driven pump generates a wheel-feed hydraulic input. Control means suppress the decel bias with a controlled percent of wheel slippage and include a differential flow-responsive bypass valve for reducing the hydraulic input as a function of flow and a variable orifice pressure-compensating valve for metering out the hydraulic input as a function of pressure.

Fig-11

ACTUAL WHEEL SPEED CHARACTERISTIC CURVE SHOWING "RISE AND FALL OF SPEED CYCLE DESCRIBED IN SEQUENCE 'C' THRU 'I'"

HYDRAULIC ANTISKID SYSTEM

BACKGROUND OF THE INVENTION

1. The Field of the Invention

This invention relates generally to wheeled vehicles and more particularly to an antiskid system for wheeled vehicles.

2. The Prior Art

In prior art arrangements heretofore provided various means have been included in braking systems in order to insure wheel slippage sufficient to maximize vehicular control. The approach most frequently taken is to provide a complicated and expensive electronic control system wherein braking effort is modulated under the control of an electronic regulator. Such systems frequently result in the cyclic application of braking effort. The deceleration of the vehicle is correspondingly cyclic in character, thereby contributing to the discomfort of the rider.

SUMMARY OF THE INVENTION

In accordance with the principles of the present invention, a completely hydraulic skid control system is provided wherein an hydraulic pump and its flow-regulating valve becomes, in effect, an analog computer to secure a programmed wheel deceleration that will provide a time relationship to vehicle speed for differing vehicle velocities and road conditions. It is contemplated by the present invention, therefore, to utilize a method of programming wheel deceleration of a wheeled vehicle wherein a supply of liquid is driven through a closed circuit in the form of a stream. At one point in the circuit, the liquid is pressurized as a function of rotational wheel speed to develop a wheel-feed input. At a second point in the circuit all of the liquid thus pressurized in the circuit is directed through an orifice to develop a pressure drop variable as a function of the liquid flow. At a third point in the circuit deceleration bias is selectively applied to the wheels of the vehicle as a function of the wheel-feed input. At a fourth point in the circuit between the first and second points, the pressurized liquid is bypassed as a function of the pressure drop variable to suppress the deceleration bias. At a fifth point in the circuit between the second and third points, the pressurized liquid is metered out as a function of the pressure to maintain a constant flow through the orifice, thereby to maintain a regulated percent of wheel slip. The programmed deceleration which occurs is so smooth and so regular that even under a so-called panic stop condition, no perceptible cycling side effects are imposed upon the rider of the vehicle.

The hardware required for practicing the principles of the present invention may include a positive displacement slipper-type pump driven from the propeller shaft of the vehicle, if it be an automobile or a truck of current vintage and preferably a slipper-type pump which is combined with a differential area flow regulating valve. In addition, there is provided a pressure-compensating valve together with a throttle valve and a governor shift valve, all of which are combined with the pump and differential flow control valve, thereby to enable the pump and valve combination to function as an analog computer and without the necessity of incorporating any further control devices.

DESCRIPTION OF THE PREFERRED EMBODIMENTS

Figure 1:
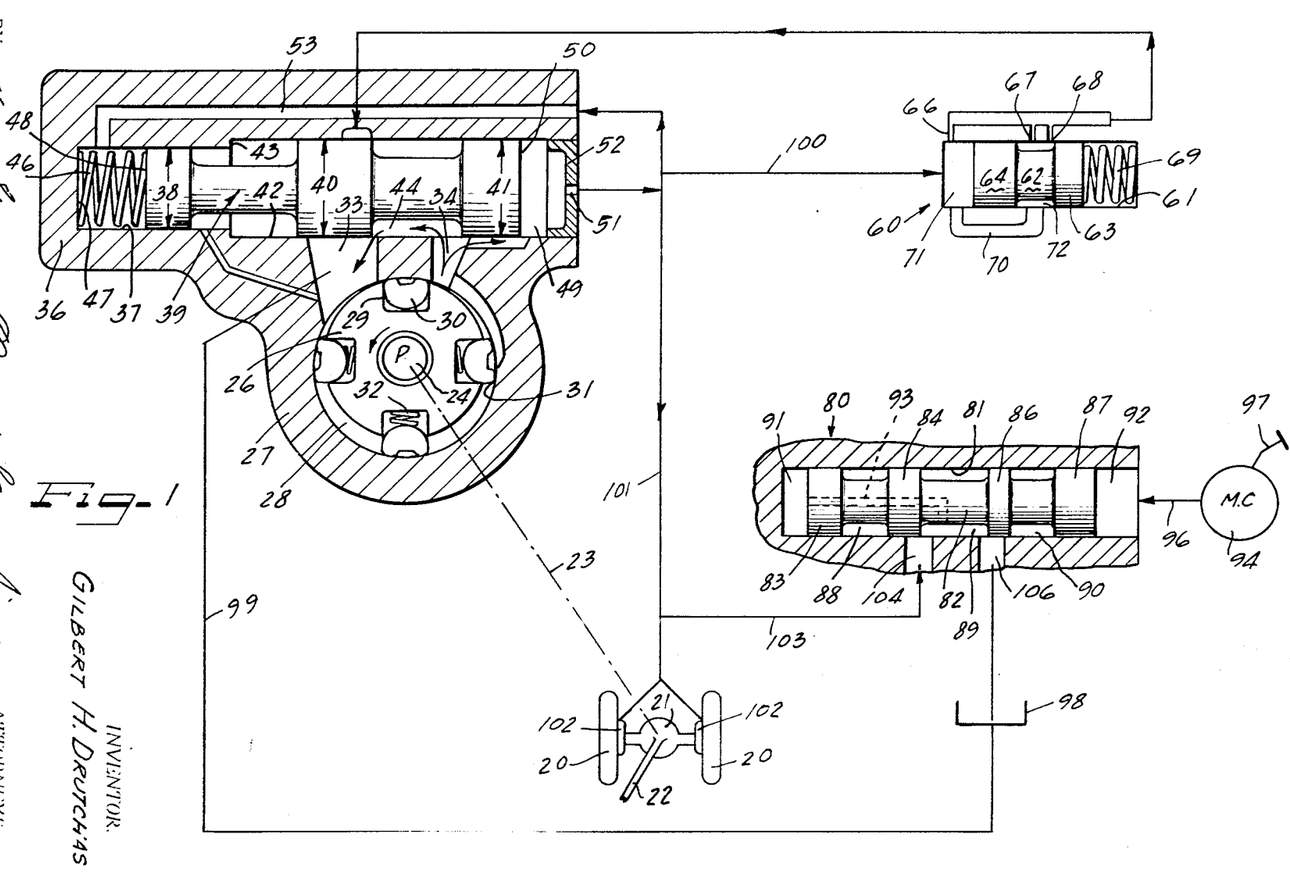
FIG. 1 is a somewhat schematic plumbing diagram and illustrating general constructional features of the pump and valve combinations contemplated by the hydraulic antiskid system of the present invention.

The skid control of the present invention is used in conjunction with a wheeled vehicle depicted in FIG. 1 by a pair of wheels shown at 20 driven through a transmission 21 by a propeller shaft 22. A suitable mechanical connection is shown at 23 and may consist of a timing belt or the like to form a driving connection for an input shaft 24, thereby to rotatably drive a rotor 26 within a casing 27 of a pump having a working chamber 28.

Although the pump may take many forms, an exemplary form of pump illustrated herein as a slipper-type pump wherein the rotor has a plurality of slots 29 formed in the periphery thereof, with each slot receiving therein a so-called slipper or pumping element 30 which is free to move radially and to rock angularly in following the adjacent contour of a bore wall 31 prescribing the confines of the pumping chamber 28. Each pumping element 30 is backed by a spring 32 bottomed in a corresponding slot 29 thereby to initially load the slippers or pumping elements 30 radially outwardly against the bore wall.

The casing 27 has an inlet 33 and an outlet 34 and is shown as being provided with an enlarged boss 36 in which moves a differential area flow control valve provided in accordance with the principles of the present invention. More specifically, the boss 36 has a first bore 37 in which is received a land 38 of a spool valve shown generally at 39 and which land 38 is of a minimum diameter relative to a pair of axially spaced lands shown at 40 and 41 and which are of a relatively maximum diameter and which move in an enlarged bore or counterbore 42 spaced axially from the bore 37 and separated therefrom by a shoulder 43.

The lands 40 and 41 control a bypass passage 44 through which liquid at pump-generated pressure is directed from the outlet 34 to the inlet 33 during a bypass condition.

A coil spring 46 is bottomed against an end wall 47 in the boss 36 and the other end of the spring 46 is bottomed against the end of the valve 39 as at 48.

Liquid at full discharge pressure is directed to a space 49 forwardly of the spool valve 39, thereby to act on a motive surface 50 and from the space 49 the liquid is discharged through an orifice 51 formed in an orifice plate 52. A return passage 53 communicates fluid on the discharge side of the orifice 51 back to the space in which the coil spring 46 is located, thereby to act on the back end of the spool valve 39,48, and which back end also forms a motive surface of the valve. It will be apparent that the difference in area permits the valve 39 to operate as a differential area valve for purposes which will be apparent as the description proceeds.

A pressure-compensating valve is shown on FIG. 1 generally at 60 and includes a valve bore 61 in which moves a spool 62 having a pair of axially spaced lands 63 and 64 for regulating flow through a plurality of axially spaced orifices of which three are shown in FIG. 1, namely, a first orifice 66, a second orifice 67 and a third orifice 68. The spool is preloaded by a coil spring 69 and a passage 70 is shown for connecting a front space 71 with a recessed area 72 between the lands 63 and 64.

There is also provided in FIG. 1 a throttle valve shown generally at 80 and including a valve bore 81 in which moves a spool 82 having four axially spaced lands 83, 84, 86 and 87 separated by recessed areas 88, 89 and 90, respectively.

Spaces are left in the valve bore at the opposite ends of the valve as shown at 91 and 92. Also, the spool 82 has an internal passage formed therein at 93 to communicate the space 91 with the recess 89. The space 92 is communicated with the master cylinder 94 of the vehicular braking system via a conduit 96 and hydraulic pressure is generated by the usual pedal-operated actuator of the vehicular braking system shown at 97. A return sump 98 is shown connected with the pump inlet by a return conduit 99. Fluid discharged from the orifice 51 is split through a conduit 100 leading to the pressure-compensating valve and through a conduit 101 leading to the brake cylinders 102 of the wheels 20,20. A conduit 103 connects the conduit 101 with the passage 104 formed in the throttle valve, there being a second passage 106 leading to the sump 98.

The interaction of the pump and the hydraulic control circuit for a "normal braking stop" with the skid control unit inoperative and the pump supplying power braking for the wheels and brake cylinders can be described in connection with the structure of FIG. 1 as follows. Assume that the vehicle represented by the wheels 20,20 is traveling down a normal road surface at any selected speed. The following operating modes would then exist in reference to the structure of FIG. 1:

A. The regulating valve 39 is bypassing pump-generated pressure from the outlet 34 through the recess 44 into the inlet 33.

B. The throttle valve 82 is open and fluid furnished from the pump through the conduit 101 is being bypassed by the conduit 103 through the passage 104, the recess 89 and the passage 106 back to the sump 98 connected to the pump inlet via the conduit 99.

C. The pressure compensating valve 62 is experiencing low pressure and remains in the maximum open position, thereby allowing part of the pump output to pass at minimum pressure drop across the pressure-compensating valve.

D. Operator gradually applies brakes via the actuator 97. The pressure in the master cylinder 94 will rise, thereby energizing the throttle valve 82 and will cause system pressure to rise in a 1/1 response.

E. The flow split from the orifice 51 through the conduits 100 and 101 continues to deploy to bypass at the throttle valve 82 to the pressure-compensating valve 62 and over the regulator spool 39 to the pump inlet 33.

F. Flow coursing through the pressure compensating valve 62 maintains equivalent pressure intensity to the throttling valve back pressure in the space 91. Opening of the throttle valve 82 bypass prevents dynamic energization or "escalated closing effect" of the pressure compensating valve 62. The skid control system will remain inoperative and cylinder pressure is applied to the brake cylinders 102,102 of the wheels 20,20 by the skid control pump 27.

Assuming now that the vehicle is traveling down the road at any selected speed and the operator of the vehicle exerts a maximum braking effort, sometimes referred to as a panic-braking stop. The following operating modes will then exist:

A. The operator applies maximum effort to the brake actuator 97 in a panic-braking effort, thereby generating sufficient pressure in the master cylinder 94 so that the pressure transmitted through the conduit 96 will enter the recess 92 and start to close the throttle valve 82.

B. Flow from the orifice 51 initially splits to flow through the throttling valve line 100 and the parallel line 101 to the pressure-compensating valve 62 and dynamically alters its mode on rapid closing of the throttle valve to become predominantly a surge through the line 100 to the pressure-compensating valve 62.

C. Urged to close by increasing pressure resulting from the shunting of full regulating valve orifice output, the closing pressure compensating valve rapidly increases system pressure.

D. Rising system pressure reacts on the wheel cylinders creating a wheel deceleration bias trend. As wheel speed drops, the pressure-compensating valve 62 adjusts to permit pressure drops through the orifices 66, 67 and 68.

E. Dropping wheel speed of the wheels 20,20 results in reduced speed of operation of the pump and lessens the flow of fluid through the orifice 51 which lowers the flow incrementally through the orifice 51.

F. Lessening flow through the pressure-compensating valve orifices results in a further dropoff through the pressure-compensating valve.

G. The drop in pressure is amplified by the pressure control valve's increased orifice area opening as the pressure drops because of the multiple openings 66, 67 and 68. That results in a wheel deceleration bias suppression point in the wheel speed.

H. Dropping pressure on the wheel cylinders 102,102 causes the wheels 20, 20 to increase speed, thereby increasing the speed of the pump. Upon increasing the speed of the pump, flow through the flow orifice 51 will course through the line 100, thereby increasing the drop across the pressure control valve 62 with a resulting rise in cylinder pressure.

I. Thus, the cycle of the foregoing modes "C" through "H" is repeated until the vehicle reaches zero velocity.

The foregoing operational modes can be more clearly understood if considered in conjunction with the sequence chart arrangements of FIGS. 2—5, inclusive.

Figure 2:
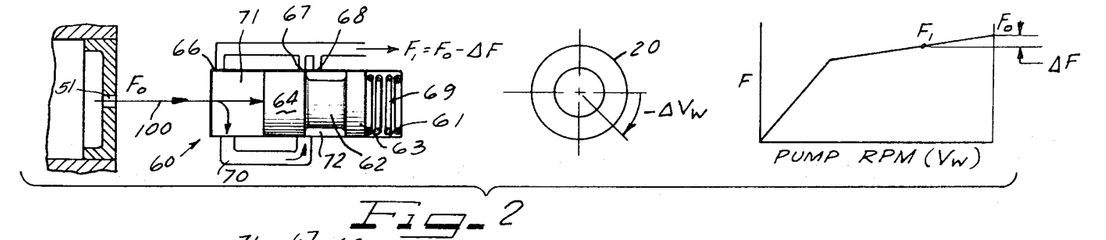
FIGS. 2, 3, 4 and 5 are composite sequence charts illustrating schematically and graphically operating sequences during different operational phases in the use of the hydraulic antiskid system of the present invention.

Referring, first of all, to FIG. 2, a condition is depicted corresponding to sequence steps C, D and E wherein wheel cylinder pressure is increasing and the wheels 20,20 are decelerating.

Figures 3, 4:
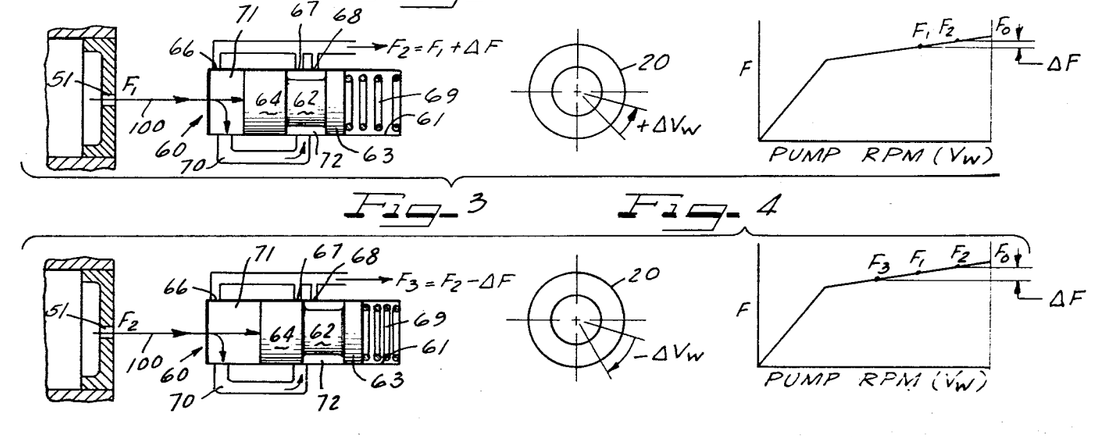

In FIG. 3, the wheel cylinder pressure is diminishing and the wheels accelerate, thereby illustrating the operating modes corresponding to sequence F, G and H.

In FIG. 4, the wheel cylinder pressure increases and the wheels decelerate, thereby providing a repeat of the modes of sequence C,D and E.

Figure 5:
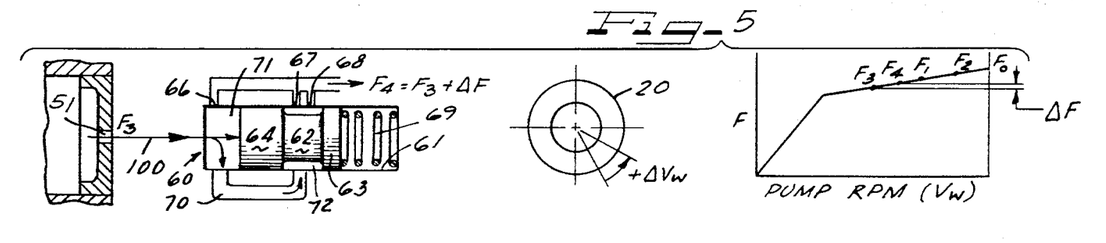

In FIG. 5, the wheel cylinder pressure again diminishes, and the wheels accelerate, thereby repeating sequence F, G and H.

The structural and functional arrangement thus far described is applicable to either a two-wheel or a four-wheel braking system. It is contemplated by the present invention, however, that further sophistication of the basic control circuit will secure the performance and fail-safe modes which would appear to be required for widespread application and commercial acceptance in the automobile industry. For example, particular attention is required in maintaining a low transitional pedal feel between the static and dynamic brake functions. Since normal commercial power brakes are completely static, a feel deviation could lead to the need for driver acceptance of a new braking feel. To minimize such complications, a total system embodiment of a control mechanism suitable for either four-wheel controls or two-wheel controls is illustrated in FIGS. 6—10. The system of FIGS. 6—10 minimizes control variations from static to dynamic modes and provides a fail-safe mode, as well as adaptive braking with a controlled percent of slip. Like reference numerals are employed where feasible. Thus, referring to FIGS. 6—10, it will be noted there is provided a pump P having an input shaft 24 to which is connected a pulley sheave 24a. The pump P has its own reservoir indicated at 98 and includes a filling inlet 110 through which makeup fluid may be added to the system.

Figure 6:
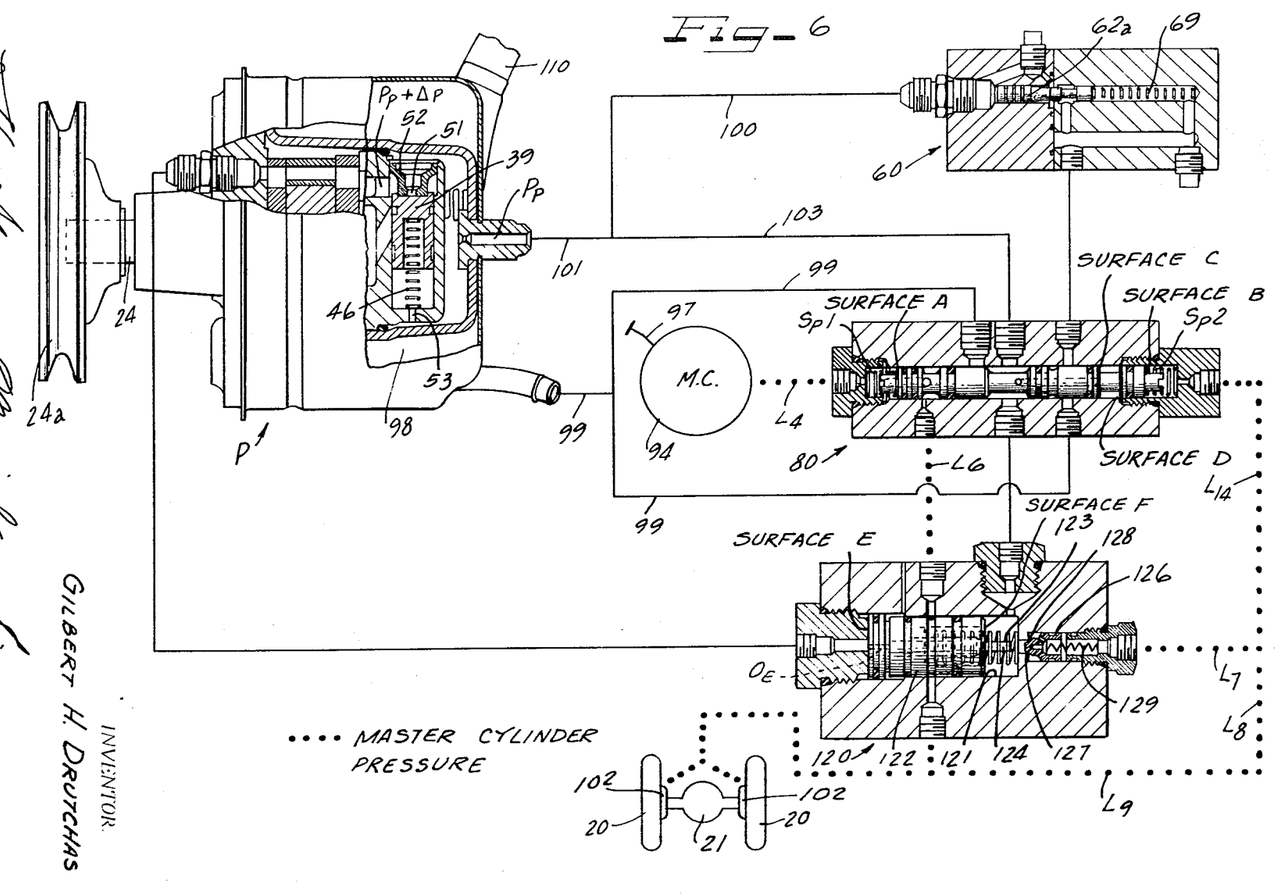
FIG. 6 is a static braking circuit trace illustrating operating conditions when the vehicle is stationary or operated in reverse.

In FIG. 6, the pressure-compensating valve is again shown at 60, however, instead of multiple orifices, the valve includes a spool 62a which is a tapered spool, thereby providing a continuous adjustability characteristic instead of a stepped pressure adjustment characteristic.

The throttling valve is also again shown at 80. Additionally, as shown in FIG. 6, there is provided a governor shift valve shown generally at 120. The governor shift valve includes a valve bore 121 in which is movable a spool 122 biased towards a closed position by a coil spring 123. The spool 122 includes a push rod 124 and a check valve 126 having a head 127 which closes against a valve seat 128 and which is biased towards closed position by a spring 129.

To facilitate description of the control functions encountered in static master cylinder and pump-powered dynamic circuits of the hydraulic skid control system contemplated by the present invention, a different mode is depicted in each of the circuit traces of FIGS. 6—10, inclusive.

Mode 1

Referring first of all, to the trace circuit of FIG. 6, an operational mode is illustrated wherein the vehicle is either stationary or is being operated in reverse. During the static function, the throttling valve spool 82 remains in a locked position under the constraint of a spring SP2 and the master cylinder pressure acting on the surface B.

Since the combination of forces induced by the spring SP2 and the master cylinder pressure registering on the surface B remains effectively larger in magnitude than the force of a spring SP1 and the master cylinder pressure acting on the surface A, the surface B having an area in excess of the surface A, the governor shift valve spool 122 has not shifted as the vehicle is at zero r.p.m. Accordingly, the push rod 124 remains separated from the check valve 126. The check valve 126 is closed by the master cylinder pressure exerted through the line connection indicated at $L_4$, $L_6$, $L_9$, $L_8$ and $L_7$.

Mode 2

Figure 7:
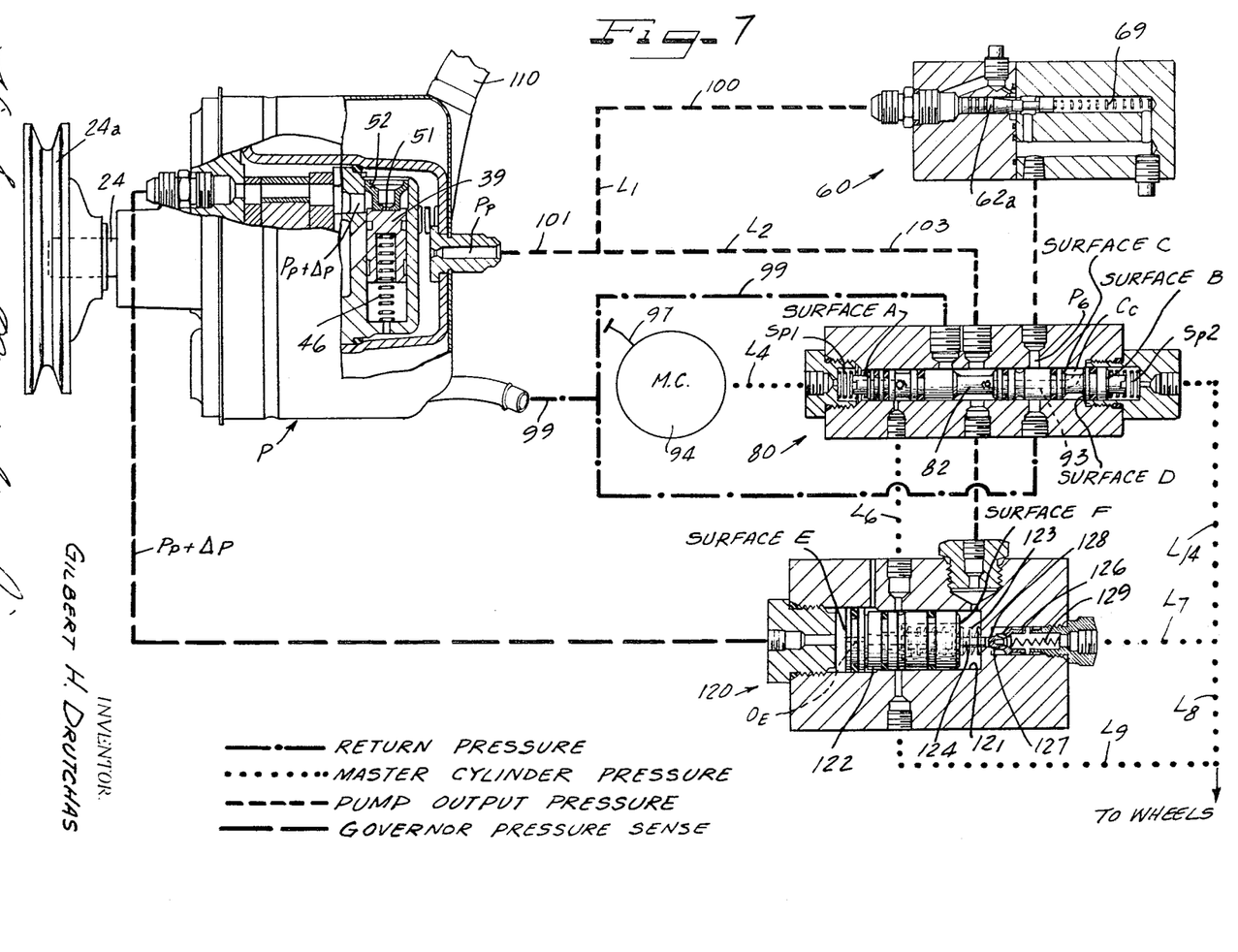
FIG. 7 is a static braking circuit trace when the vehicle is operated below a predetermined cutoff speed.

The trace circuit shown in FIG. 7 illustrates a mode of operation wherein static braking occurs under a predetermined cutoff speed but with the vehicle in motion. Thus, the trace circuit of FIG. 7 shows a single static circuit and three parallel dynamic circuits. The static mode is identical to that already described in connection with trace circuit of FIG. 6, however, FIG. 7 has two dynamic functions "B" and "C" which do not influence the predominantly static characteristic of the braking mode.

The dynamic mode B originates at $L_1$ or the conduit 100. Flow issuing from the pump P passes through $L_1$ into the pressure-compensating valve 60 to the throttle valve passage P6 where it is blocked. This closure point is referred to as the "-metering-out, cutoff." The metering-out cutoff provides a means of reducing pump leakage at the start of a skid-control energizing cycle. Although the pressure-compensating valve pressure buildup is self-energizing, this function provides a means of speeding the energizing of the pressure-compensating valve.

The dynamic mode "C" also originates at $L_1$ splitting to $L_2$ through a line corresponding to the conduit 103 in FIG. 1 and thence through the throttle valve 80. At the throttle valve 80, it splits into three subpaths. The first subpath is a bypass function and remains open in the "under cutoff speed mode." The spool of the throttle valve 82 is balanced by the master cylinder pressure on the front of the valve spool and pump pressure at the rear thereof as transmitted through the internal passage 93. The second subpath provides a means of bringing pump pressure into a cavity shown at $C_C$. The third subpath delivers master cylinder pressure to the brake cylinders.

Mode 3

Figure 8:
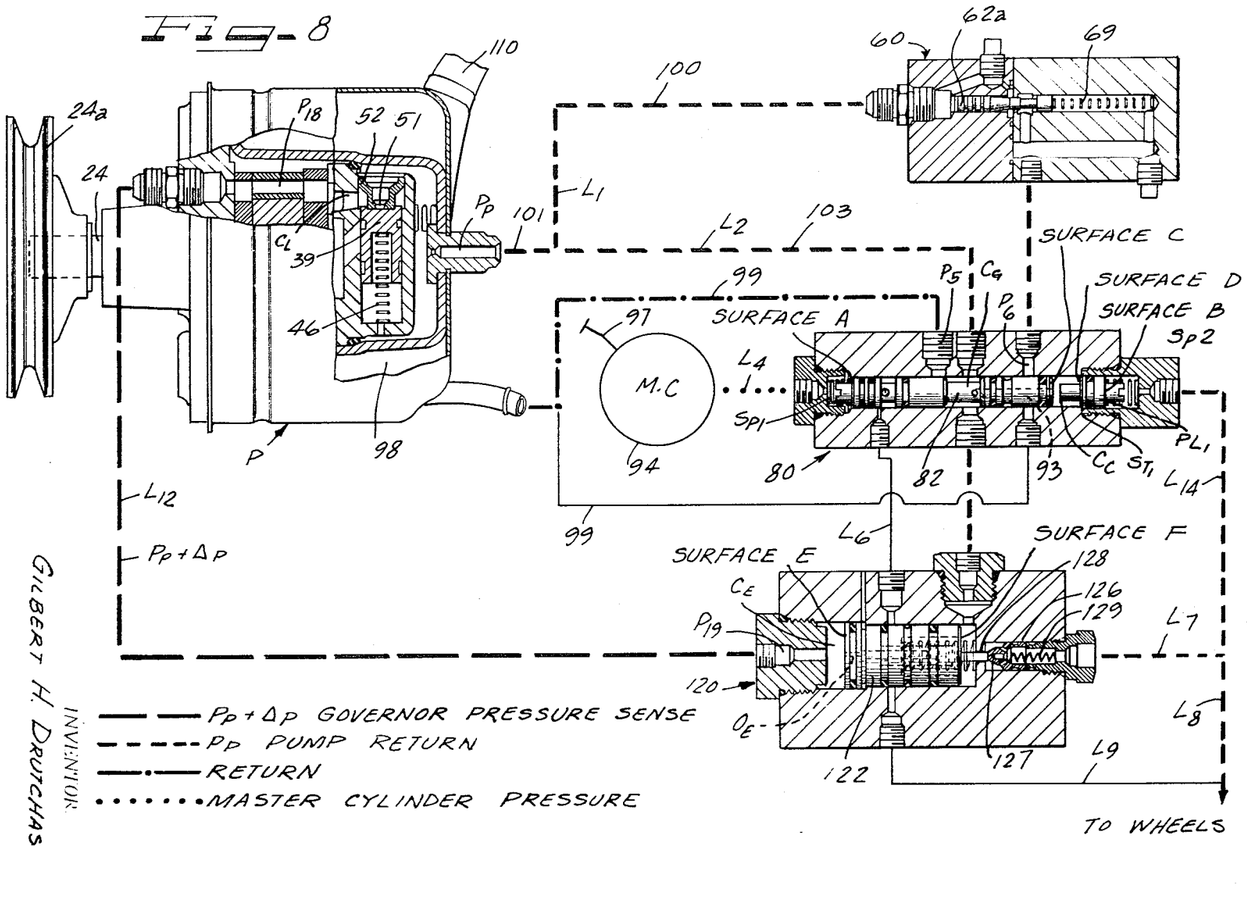
FIG. 8 is a proportional 1/1 circuit trace corresponding to an operating condition during pump-powered braking above the predetermined cutoff speed.

The trace circuit shown in FIG. 8 illustrates a mode of operation wherein proportional braking (1/1) is above pump cutoff speed. In this mode, the throttle valve 80 has its spool 82 biased to close the bypass passage $P_5$ by a virtual 1/1 master cylinder to pump relationship. Such closure is accomplished through setting the throttle valve spool 82 in a normally closed position at zero pump speed. As the pump speed builds up, the valve spool 82 shifts under the influence of pump pressure imposed on the surface labeled in FIG. 8 by the legend surface C. The surface of the valve labeled by the legend "surface A" at the rear of the throttle valve 80 is at zero pressure with no master cylinder pressure applied. Thus, the throttle valve spool 82 prepositions itself so that its opening is in correspondence with the pressure that is being bypassed. Application of the master cylinder pressure at the throttle valve rear surface A forces the throttle valve to move to the right, using the orientation of FIG. 8, thereby closing the bypass passage $P_5$ and building pump pressure up. The rising pump pressure is sensed to the valve fore from the cavity $C_G$ through the passage 97 to the cavity $C_C$ where the valve fore surface C retains a 1/1 relationship with pressure on the throttle valve surface A. That relationship is vital in controlling pedal feel.

The surfaces on the throttle valve spool 82 indicated by legend at surface D and surface B experience equal pressure reactions and the plug $PL_1$ remains fixed against the stop identified at $ST_1$. The plug $PL_1$, of course, cannot move to the left under any operational mode.

The dynamic pressure drop resulting from the rising flow generated by the pump P as speed increases references through the cavity $C_L$, through a passage $P_{18}$, through the line $L_{12}$, the passage $P_{19}$, to a cavity $C_E$ and registers on a surface labeled by legend surface E formed on the spool 122 of the governor shift valve 120. Thus, the spool 122 of the governor shift valve 120 is urged to the right (FIG. 8) as pressure increases on the surface E which is on the upstream sense side of the orifice 51.

The governor shift valve 120 is a speed-sensitive valve used to shift the operation of the skid control system from static to dynamic circuits. Thus, an orifice $O_E$ acts as a dashpot for the governor shift valve 120 and an action surface F on the spool 122 of the governor shift valve 120 remains at the pressure level of the downstream side of the orifice 51.

Mode 4

Figure 9:
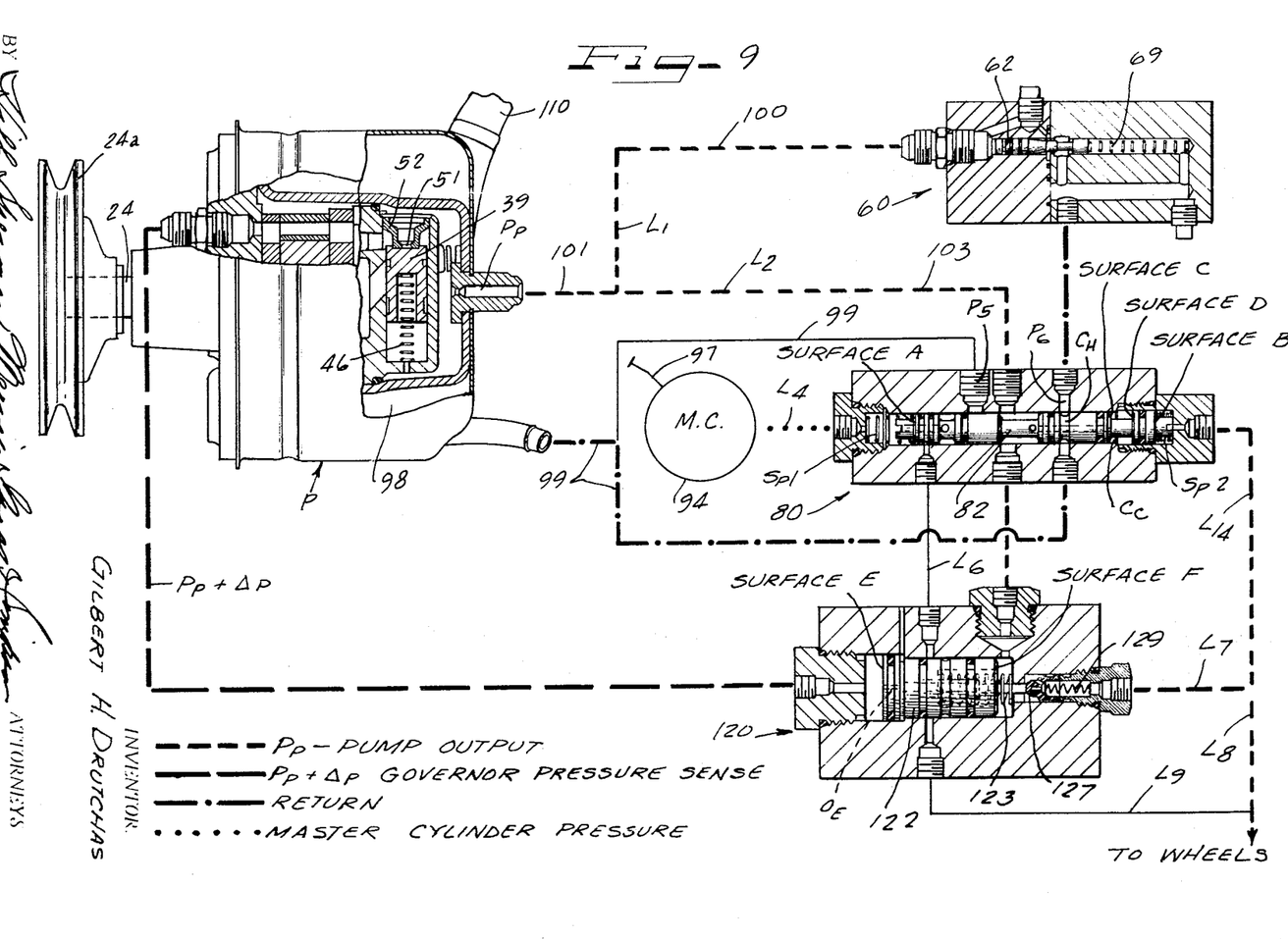
FIG. 9 is a 1/1 braking circuit trace illustrating proportional braking above cutoff speed and with the skid control operative.

The trace circuit shown in FIG. 9 represents an operational state similar to mode 3, however, since skid requirements are signaled by a sudden change in pump speed or dropoff in flow resulting from a reduction in the rotational speed of the wheels 20,20, the throttle valve 80 closes under a sudden loss of pressure-generating capacity on the part of the pump P. Such closure occurs rapidly as pressure on the surface C drops and is exceeded by the constant master cylinder pressure acting on the surface A of the throttle valve 80. The closing of the bypass $P_5$ opens the metering-out cutoff passage $P_6$ to the annulus chamber $C_H$ allowing the pressure-compensating valve 60 to meter out, inducing controlled slippage of the wheels 20,20 as a function of pressure.

Mode 5

Figure 10:
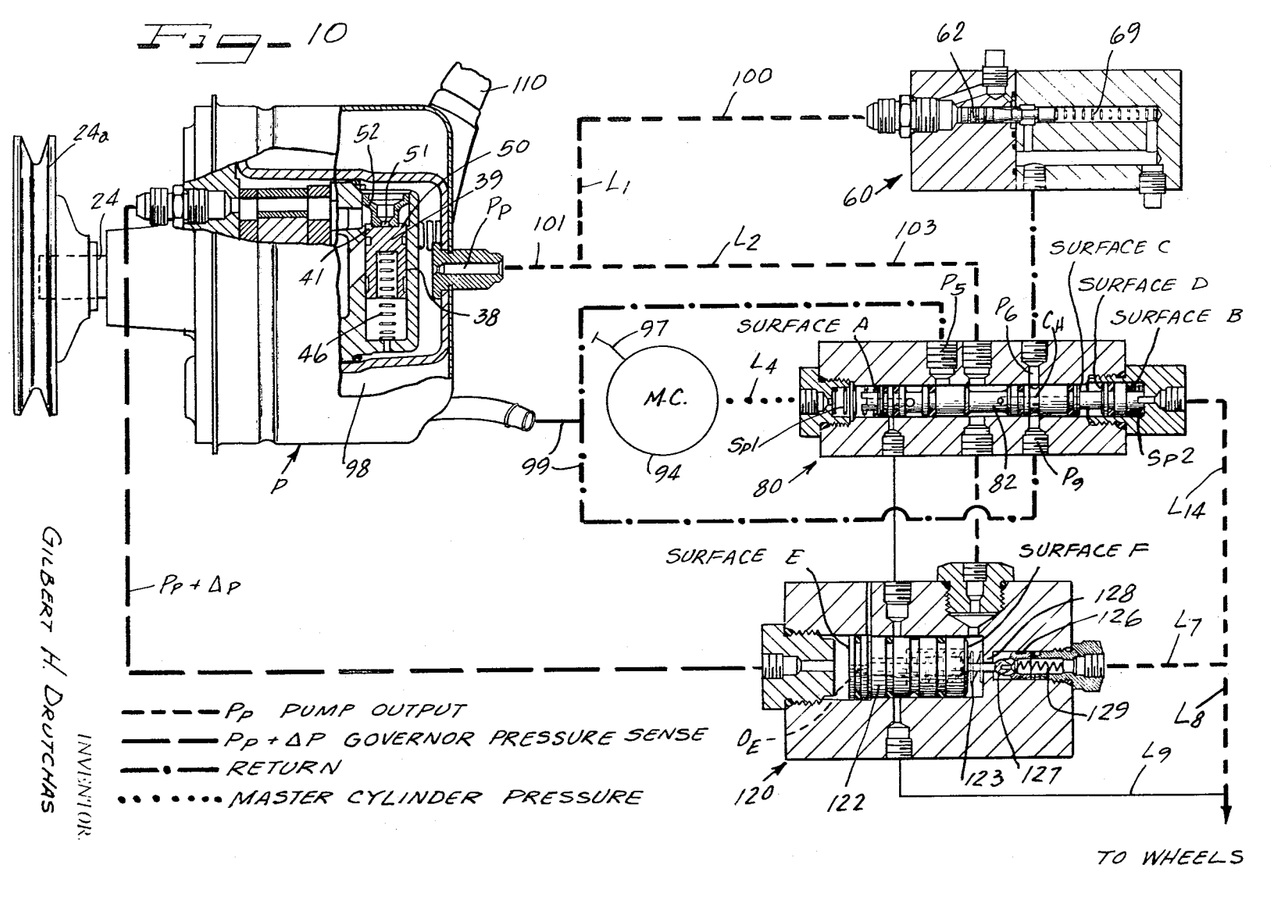
FIG. 10 is an on-panic stop circuit trace showing operative conditions in a full panic stop with the skid control operative.

The circuit trace of FIG. 10 depicts an operational mode wherein the system is subjected to a so-called "panic-stop," that is when the vehicle operator exerts a maximum braking effort and the skid control of the present invention is fully operative. Experiencing a similar dynamic unbalance between the surface A on the throttle valve 80 at the rear of the throttle valve spool 82 and the surface C on the fore of the throttle valve spool 82, due to rapid master cylinder application, the throttle valve spool 82 closes the bypass passage $P_5$ and opens the pressure-compensating valve 60 to metering out bypass through the passage $P_6$, the valve cavity $C_H$ and the passage $P_9$, thereby achieving skid control as described hereinabove in connection with sequenced chart arrangements of FIGS. 2—5.

A completely and fully hydraulic system is achieved in accordance with the prinicples of the present invention by utilizing the flow control valve of the differential area type and incorporating the valve spool 39 wherein the differential areas are developed by the end surface of the reduced land 38 and the larger end surface 50 on the land 41. Thus, the flow control valve is kept open and displays a characteristic which makes it retain governor speed sense whether pressure in the system is high or low. Such characteristics are imparted because the differential area type of valve retains a constant spring force reaction with high flow, low pressure or in the opposite state of high pressure, low flow.

To further retain a linear relationship between the flow control valve and the governor shift valve 120, the governor shift valve 120 is also of a differential form. Thus, speed sense remains unimpaired as static pressure rises and dynamic pressure drops across the orifice 51. Conversely, the speed sense is retained as the dynamic drop rises and the static pressure drops, cancelling out nonlinearities of sense between the pressure-regulating valve 39 and the governor shift valve 120.

There is thus secured in accordance with the principles of the present invention a programmed wheel deceleration that will provide a time relationship to vehicle speed for differing vehicle velocities and road conditions.

Figure 11:
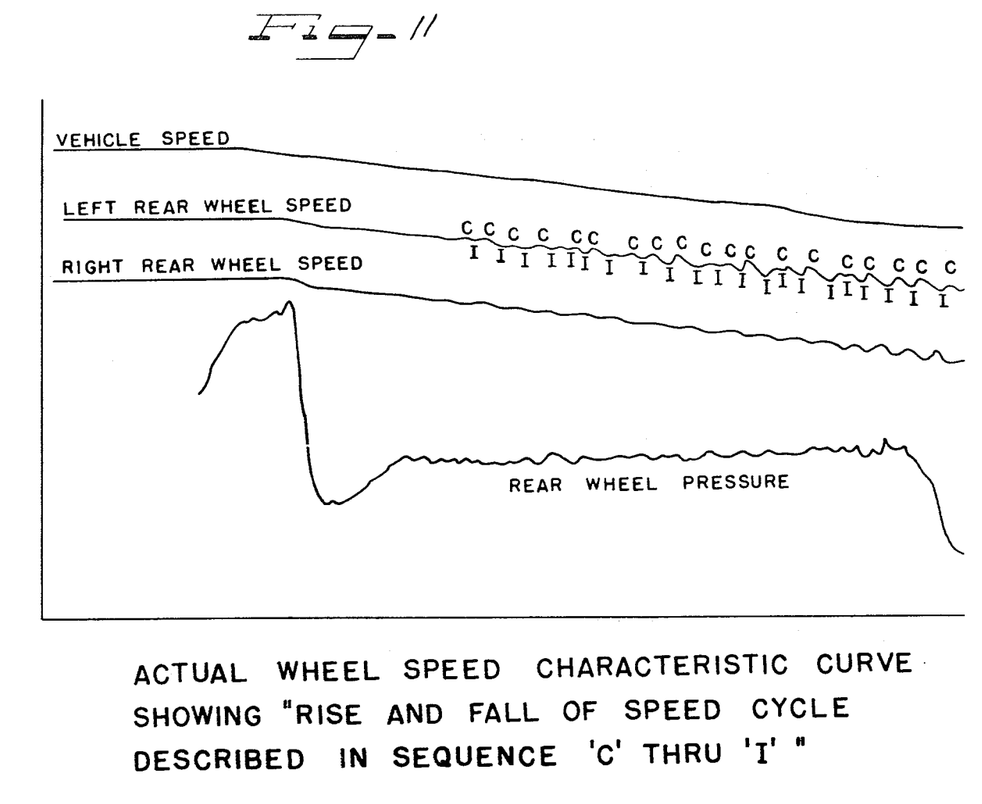
FIG. 11 is a family of curves showing actual wheel speed characteristic curves in the operation of a vehicle embodying the principles of the present invention.

FIG. 11 is a family of curves showing the actual operation of a vehicle equipped with a braking system in accordance with the principles of the present invention. The wheel speed characteristic curve shows the rise and fall of the speed cycle described in sequence "C" through sequence "I" of the sequence charts FIGS. 2—5, inclusive. It will be noted that the cycle is completed so effectively as to minimize control variations from static to dynamic modes, thereby producing no perceptible cycling side effects on the operator or the passengers in the vehicle.

I have disclosed hereinabove a method of skid-control braking wherein a combined wheel speed sensing and brake-actuating device is used to continuously sense the average of rear wheel speed, which in turn is a function of the balance between wheel (tire to road) torque and brake torque. This device automatically adjusts brake torque to maintain the desired equilibrium between wheel and brake torques for optimum wheel-to-road slip to provide maximum brake effectiveness and vehicle lateral stability.

The operational principle of the present invention is one of extremal control, reaching a near torque equilibrium between brake torque and surface torque at the maximum (extremal) value of surface torque. In other words, the system of the present invention constantly seeks the peak of the $\mu$ (coefficient of friction)—slip curve by modulating pressure towards critical slip. By utilizing this control from surface torque, the present system offers significant advantages compared to mere slip control, for example. Thus, there is immediate response to the key initial conditions of a stop-road surface condition. There is also inherent system response to major conditions such as vehicle load distribution, vehicle tire conditions and degraded brakes. Such conditions are variables that manifest themselves in the development of the torque which the system tends to put in equilibrium. There is no need with the present system to input vehicle speed to the control system since torque is the essential system input. Further, there is no need to input the shape and magnitude of the tire-road coefficient of friction versus slip curve. Moreover, since drive shaft sensing is utilized, there is inherently produced a 'high' operation, i.e., operating the wheel with the highest available surface torque. There is also full-time component operation during normal braking which enhances system readiness confidence level when a panic stop mode arises. The amplitude of the pressure cycling, when it occurs, is such that there are no effects perceptible to the operator.

Although minor modifications might be suggested by those versed in the art, it should be understood that I wish to embody within the scope of the patent warranted hereon all such modifications as reasonably and properly come within the scope of my contribution in the art.

I claim:

1. The method of programming wheel deceleration of a wheeled vehicle which includes the steps of
   driving a liquid through a closed circuit in the form of a stream,
   at one point in the circuit pressurizing the liquid as a function of rotational wheel speed to develop a wheel-feed input,
   at a second point in the circuit directing all of the pressurized liquid through an orifice to develop a pressure drop variable as a function of flow,
   at a third point in the circuit selectively applying a deceleration bias to the wheels of the vehicle as a function of the wheel-feed input,
   at a fourth point in the circuit between said first and second points bypassing pressurized liquid as a function of said pressure drop variable to suppress the deceleration bias,
   at a fifth point in the circuit between said second and third points metering out pressurized liquid as a function of pressure to maintain a constant flow at said second point,
   thereby to maintain a regulated percentage of wheel slip by modulating pressure toward critical slip, namely, by constantly seeking the peak of the coefficient of friction-slip curve.

2. The method of skid control in a wheeled vehicle based on an operational principle of extremal control and which includes the steps of driving liquid through a closed circuit in the form of a stream,
   at one point in the circuit pressurizing the liquid with a wheel-driven pump driven as a function of rotational rate of speed of the wheels,
   at a second point in the circuit utilizing the pressurized liquid to generate and apply a decel bias to the wheels selectively to decelerate the vehicle as a function of pump-generated pressure,
   at a third point in the circuit metering out liquid supplied to said second point as a function of both pressure and flow
   thereby to suppress the decel bias to a preselected lesser value to reach a near torque equilibrium between brake torque and surface torque at the extremal value of surface torque so that the decel bias is maintained at a level below that necessary to lock the wheels thereby seeking the peak of the coefficient of friction-slip curve.

3. An hydraulic skid control operable on the principle of extremal control comprising,
   hydraulic braking means for applying a decel bias to the wheels of a vehicle,
   a wheel-driven pump for generating a wheel feed hydraulic input,
   and control means for suppressing the decel bias with a controlled percent of wheel slippage to reach a near torque equilibrium between brake torque and surface torque at the extremal value of surface torque,
   said control means comprising a differential flow-responsive bypass valve for reducing said hydraulic input as a function of flow and a variable orifice pressure-compensating valve for metering out said hydraulic input as a function of pressure, thereby to seek the peak of the $\mu$-slip curve.

4. In combination with a wheeled vehicle, means forming a closed hydraulic circuit,
   a positive-displacement pump at one point in said circuit, wheel-actuated driving means for driving said pump and pressurizing the liquid to develop a wheel-feed input for said circuit which is related to rotational wheel speed,
   hydraulic brake means at a second point in said circuit receiving liquid from said pump to apply a decel bias to the wheels,
   and decel bias suppression means comprising
   a flow-responsive bias valve for selectively bypassing the discharge of said pump back to inlet,
   said decel bias-suppression means further comprising
   a pressure-compensating valve at a third point in said circuit between said first and second points and metering out liquid from said circuit,
   said pressure-compensating valve having variable orifice means sized to maintain the flow within such a range of values that the wheels will slip at a regulated percent with respect to vehicle speed.

5. In combination with a wheeled vehicle as defined in claim 4 said flow responsive bypass valve comprising a differential flow regulator having means forming a valve bore forming annular lands and recesses in longitudinal spaced relation,
   means forming an orifice in said bore, a spool in said valve bore having corresponding lands and recesses on its annular surface forming a bypass passage for effecting said selective bypassing of said pump discharge, and differentially sized motive surfaces on said spool each forming together with said bore a pressure control area including a first pressure control area at one end of said valve receiving fluid from the downstream side of said orifice and comprising the smaller motive surface and a second pressure control area at the other end of said valve receiving pump discharge on the upstream side of said orifice, thereby to assist in maintaining the predetermined wheel slippage.

6. In combination with a wheeled vehicle, a rotary pump having a driven connection to rotate in unison with the wheels of the vehicle, said pump having an inlet and an outlet and a bypass passage therebetween, means forming a discharge orifice through which all of the liquid pumped is discharged, a flow-regulating valve of the differential type in control of said bypass passage and operable as a function of the pressure drop across said orifice, hydraulic braking means receiving liquid under pressure from said pump for selectively applying a deceleration bias to the wheels of the vehicle, a throttle valve for throttling the supply of liquid to the hydraulic braking means as a function of wheel speed, and a pressure-compensating valve to meter out liquid from the supply of liquid directed to the hydraulic braking means as a function of pressure, thereby inducing rotational slippage of the wheels in an optimum controlled range.

7. The invention of claim 6 and further characterized by said pressure-compensating valve comprising a spool-type valve having a plurality of metering orifices disposed in longitudinal spaced relation, thereby to selectively increase the orifice area opening as the valve opens.

8. The invention of claim 6 wherein said pressure-compensating valve is characterized by a spool valve having a spool formed with a tapered peripheral surface thereby to provide a continuously adjustable orifice opening upon operation of the valve.

9. The invention of claim 6 and further characterized by a governor shift valve comprising a speed-sensitive valve to shift the operation from static to dynamic operation as a function of the vehicle speed of predetermined value.

10. The invention of claim 6 wherein said rotary pump comprises a positive displacement slipper-type pump utilizing a peripherally notched rotor in which the notches of the rotor each carry a slipper which is free to rock angularly and to move radially in following the adjoining bore wall of the pumping chamber.